Patented Mar. 30, 1926.

1,578,618

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

RECOVERY OF METALS FROM THEIR ORES.

No Drawing.     Application filed November 12, 1923. Serial No. 674,383.

*To all whom it may concern:*

Be it known that I, HARRY V. WELCH, a citizen of the United States, residing at Los Angeles, in the county of Los Angeles and State of California, have invented a new and useful Improvement in the Recovery of Metals from Their Ores, of which the following is a specification.

This invention relates to the recovery of metals from ores thereof by use of a cyanide solution as a leaching agent, and by precipitation of the metal from the solution by suitable means, and the main object of the invention is to provide for the economical recovery of metals from their ores by such so-called cyanide process in cases where the ore contains a considerable amount of copper together with a precious metal such as silver. In such cases the presence of copper in any considerable amount has been considered as a bar to successful recovery of the silver content by reason of the loss of the cyanide due to reaction thereof with the copper. An important object of the present invention is to provide for economical extraction and precipitation of the silver or gold from such ores without undue loss by reason of the presence of copper in the ores. A further object of the invention is to provide a process of this kind which can be effectively carried out at ordinary atmospheric temperatures and is therefore capable of installation on a large scale with minimum expense and difficulty. Another object of the invention is to provide in a process of this kind, for selective precipitation of the silver or gold and copper so as to produce high grade bullion at minimum expense.

At the present time, there are large bodies of ore in the western part of the United States as well as Mexico and other foreign countries, too high in copper to be treated by the ordinary cyanide practice of today. In general, the treatment of ores successfully by the cyanide process, has been limited to ores not exceeding one per cent copper. However, this is due, of course, entirely to the fact that the copper cyanide compounds tie up very large quantities of cyanides and since heretofore they have been unable to recover cyanides from the copper cyanide salts so formed, the presence of copper has required the addition of sufficient cyanide to react with that portion brought in solution and this cyanide so introduced for this purpose has been completely lost.

I have discovered that by suitably proportioning the amount of soluble cyanide (sodium cyanide) present in the leaching solution to the amount of copper content in solution that the precipitating operation, for example, by means of zinc may be effected in such a manner as to precipitate and recover substantially all of the copper taken into the solution and to simultaneously regenerate a soluble cyanide corresponding approximately in amount to the cyanide retained in solution in the original solution of the copper, so that the solution and precipitation of the copper content of the ore may be carried on without undue loss of cyanide. Furthermore I have discovered that under proper operating conditions the rate of precipitation of copper, for example, by means of zinc, is so much slower than that of silver by the same operation that selective precipitation may be successfully carried out so that the silver content, for example, may be precipitated approximately free from copper, thereby obtaining a bullion of relatively high value.

The operation of my invention hereinafter described is based partly on the fact, which is known, but not well recognized in cyanide metallurgical practice that zinc cyanide in the presence of a solution containing alkali or alkaline earth is an effective leaching agent for silver, or at least that production or regeneration of zinc cyanide in solution in the presence of an alkali or alkaline earth results in the regeneration of the solution to that extent as an active leaching agent for silver. The term solvent cyanide hereinafter used is therefore intended to include not only a cyanide of an alkali metal (sodium cyanide, potassium cyanide) but also zinc cyanide in the presence of an alkali or alkaline earth (NaOH,CaO). The term regeneration as hereinafter used is also intended to mean the reproduction of a solvent cyanide in the solution in the sense above used.

In the solution of copper by means of a solvent cyanide it is generally necessary to have an excess of solvent cyanide, in such a manner that the resulting pregnant solution contains so-called combined cyanide for example, sodium cyanide associated or combined with copper, and free cyanide (sodium cyanide not associated or combined with copper) and the purpose of this invention is particularly to provide for proportioning of the solvent cyanide to the copper in such manner that the cyanide associated or combined therewith as above stated may be released and restored to the solution as an active solvent agent.

I will describe my process as applied to such recovery of silver and copper from a complex ore containing both of said metals in oxide or oxidized form. It will be understood however that the process is applicable in the treatment of ores in which either silver or copper occur in native form or in any form suitable for extraction by cyanide solutions. Such an ore containing silver and copper is reduced to a suitable state of division by grinding or otherwise milling the ore and is then treated with a leaching solution which may be the ordinary sodium cyanide solution used for this purpose. The amount of cyanide used is in any case sufficient to take up the silver and copper content to the extent which is economically practicable, it being understood that an excess of the cyanide (sodium cyanide) will generally be desirable to ensure effective and rapid extraction and retention of the dissolved metals in the solution, the amount of the cyanide which can be economically used being however limited by the necessity of avoiding undue loss of cyanide in the tailings. It will be further understood that the extraction operation will be carried on in the presence of an oxidizing agent, for example, atmospheric air, the finely divided ore being agitated by air agitation in a suitable tank so that the air acts as a mixing or agitation agent as well as an oxidizing agent. The amount of sodium cyanide used in the leaching solution will be dependent upon the silver and copper content of the ore, for example, for certain ores the solution may contain such an amount of cyanide that at the completion of the extraction, the pregnant solution will contain about three mols of sodium cyanide for each mol of silver to be extracted, and four mols of sodium cyanide for each mol of copper to be extracted from the ore. The actual concentration of the solution will of course be determined by considerations of economy, including loss in washing and in the tailings, but a satisfactory solution may contain about four grams of copper per liter, with corresponding amount of cyanide according to the proportion above stated.

The solution obtained as above described or in any other suitable manner and containing the copper and silver to be recovered is then treated, if necessary, in such a manner as to bring the cyanide content of the solution to the proper proportion required for the present process. This proportion is preferably such that the pregnant solution at completion of the silver precipitation contains sufficient free cyanide to substantially prevent precipitation of copper in the form of complex cyanides, for example, about four to six mols of solvent cyanide to one mol of copper for certain ores, it being understood that in addition to this amount there must be sufficient sodium cyanide or other solvent cyanide present to hold the silver in solution according to ordinary cyanide practice, the present invention relating particularly to the control of the cyanide content in accordance with the copper content, so as to properly control the precipitation of the copper for most economical operation. In case the solution resulting from the extraction process contains the proportion of cyanide and copper above stated, no further treatment is required precedent to the precipitation but in general it will be necessary to add sodium cyanide to the solution, before precipitation of the copper and either before or after precipitation of the silver, to bring the cyanide content up to the stated proportion in respect to the copper content. The process will generally be carried out in cyclic manner, and the maintenance of the proper cyanide ratio will be effected by adding cyanide before or during precipitation, as may be shown to be necessary by check tests of the "barren" solution for copper. The solution prepared as above described may be passed to the precipitation tank wherein it is brought in contact with a precipitating agent, for example, metallic zinc, preferably in the form of zinc dust or zinc powder, with the result that the silver is rapidly precipitated and the copper is less rapidly precipitated, for example, operating at room temperatures (25° C.) the silver content may be substantially or entirely precipitated in a few minutes, whereas only a negligible proportion of the copper is precipitated in that time. The solution after precipitation of the silver therefrom in this manner is passed to a separate precipitating tank wherein it is treated with a further quantity of precipitating agent (finely divided zinc) and is agitated with such precipitating agent for sufficient time to precipitate the desired amount of the copper present. Agitation from two to twenty-four hours will generally suffice to precipitate 90% or over of the copper content. In case the solution resulting from leaching of the ore contains less than four mols of solvent cyanide to one mol of copper it may be passed directly to the silver precipitating tank and after precipitation of the silver may be brought up to the stated proportion of solvent cyanide (four mols solvent cyanide to one mol of copper).

It will be understood that the precipitating operation may be effected under conditions of exclusion of air, for example, the solution may be subjected to exhaustion to remove dissolved air according to well known practice in the cyanide process. The silver and copper precipitated as above described may be separately collected and in that case the process has the advantage of enabling the production of silver bullion of high grade from ores containing considerable amounts of copper. A more important advantage of the process is that by the above described operation the cyanide content of the solution is conserved to an extent compatible with economical operation, even in cases where the copper content of the ore is so high that it would prevent economical operation by the ordinary cyanide process. This conservation or regeneration of the cyanide solution is due to the fact that the precipitation of silver and of copper by zinc results in production of zinc cyanide in solution and such zinc cyanide is as suitable an extraction agent for silver, when dissolved in a solution containing alkali (lime or caustic soda) as is the ordinary sodium or potassium salt of cyanide. Therefore by ensuring the precipitation of the copper as well as the silver, approximately complete regeneration of the dissolving cyanide agent may be obtained, or at least sufficient regeneration to make the process economically practicable.

The precipitate or precipitates formed as above described may be separated from the solution in any suitable manner, for example, by decantation, filtering or otherwise and the remaining solution containing regenerated solvent cyanide in proportion to the amount of silver and copper precipitated, may be used over again in cyclic operation of the process, a suitable amount of fresh cyanide being added to make up for any loss in the tailings or otherwise.

The silver and copper precipitates produced as above described may be collected separately and the silver fused to form bullion substantially free from copper or if desired the silver and copper precipitates may be collected successively in the same tank and fused together to form a silver-copper bullion.

While I have described my invention as applied particularly to the treatment of silver ores containing copper it is equally applicable to the treatment of gold ores containing copper or ores containing silver and gold together with copper.

As illustrating the critical nature of the proportion of solvent cyanide to copper content in the solution the following table is given showing in the last five columns the percentages of conversion of copper cyanide to zinc cyanide (regenerated cyanide, effective for leaching of silver). Such conversion was effected by precipitation by zinc dust from a solution containing originally 1.9 gm. copper per liter by iodide determination and 3.73 gm. cyanide per liter calculated as sodium cyanide by distillation procedure, this proportion corresponding to the formula $Cu2.52.NaCN$. By test with silver nitrate and potassium iodide this solution showed no free sodium cyanide present and corresponds to sample No. 1 in the following table. Samples Nos. II, III, IV, V and VI were obtained by adding sodium cyanide to the aforesaid solution in such amount that the respective samples contain the proportions of combined cyanide indicated in the second column and of free cyanide indicated in the third column. In this connection it may be stated that free NaCN determinations on these five solutions indicated that as the NaCN was increased the cyanide present in the solution appeared in two forms: first, that associated with the Cu and not indicated by titration with $AgNO_3$ in the presence of KI; second, that which may or may not be associated with the copper and indicated by titration with $AgNO_3$ in the presence of KI, the latter expressing the so-called "free cyanide" of metallurgical practice. In the solution, and with at least one mol free NaCN present for each mol of copper, the cyanide copper ratio expressed empirically as mols of Cu and NaCN approximates $CU3NaCN$ (combined). $X$ NaCN in which $X=1, 2, 3,$ or $4$.

The samples marked $I^A$, $II^A$, $III^A$, and $IV^A$ were solutions saturated with respect to calcium hydroxide but in other respects identical with the respective solutions I, II, III, and IV.

Table showing effective regeneration of cyanide in precipitation of copper.

| Mol ratios as determined. | | | Length of agitation period. | | | | |
|---|---|---|---|---|---|---|---|
| Cu. | NaCN combined or associated with Cu. | NaCN "free" by $AgNO_3$ titration. | 15 m. | ¼ hr. | 2 hr. | 12 hr. | 24 hr. |
| | | | Per cent. | Per cent. | Per cent. | Per cent. | Per cent. |
| I 1 | 2.52 | 0.0 | 0.0 | 0.0 | 0.0 | 0.0 | 0.0 |
| I^A | | | 0.0 | 0.0 | 0.0 | 0.0 | 0.0 |
| II 1 | 2.82 | 0.18 | 1.1 | 2.1 | 2.2 | 2.8 | 24.8 |
| II^A | | | 2.1 | 3.5 | 4.2 | 2.1 | 4.4 |
| III 1 | 2.84 | 1.16 | 12.1 | 9.7 | 6.0 | 0.0 | 0.0 |
| III^A | | | 1.1 | 9.22 | 4.4 | 2.1 | 1.15 |
| IV 1 | 3.06 | 1.94 | 8.0 | 9.7 | | 91.0 | 94.0 |
| IV^A | | | 5.6 | 7.8 | 6.1 | 14.5 | 71.6 |
| V 1 | 2.96 | 3.04 | 12.6 | 16.2 | 51.2 | 100.6 | 101.8 |
| VI 1 | 2.95 | 4.05 | 12.7 | 22.0 | 60.7 | 98.0 | 101.5 |

The conversion of cyanide combined with copper to cyanide combined with zinc in excess of 100% indicated in last two samples, will be understood as being due to unavoidable slight error or loss encountered in determination of the total cyanide present in copper cyanide solution by distillation in the presence of sulphuric acid and on which the efficiency figures of the table were based. The cyanide combined with the zinc being determined on a cold solution, did not suffer from this error or loss, the said excess, however, being within the limits of error.

As illustrating the effectiveness of the process in successive precipitation, a silver solution was prepared containing ten ounces of silver per ton of solution and one eighth per cent of copper, and the cyanide and copper content adjusted in the first solution to bear the ratio of one copper to four cyanide, and in the second solution, one copper to six cyanide. In both solutions, ninety per cent of the silver was precipitated in five minutes' agitation with zinc powder, and in the first solution 1.1 per cent of the copper, and in the second solution, 2.6 per cent of the copper was precipitated with the silver.

Further agitation with a second quantity of zinc at room temperature for somewhat less than a day showed a recovery of the cyanide as zinc cyanide available in the presence of lime as a solvent for silver, together with the precipitation of copper. The precipitation of the copper in solution was as expected—proportional to the combined cyanide recovery. A substantially complete precipitation of the copper and regeneration of the cyanide, is secured on further continued agitation, increasing the temperature, amount of zinc, etc.

I have found it advantageous to add with the powdered zinc an inert medium such as glass balls or sand, which serves to keep the zinc in suspension, or prevents agglomeration of zinc dust particles, and possibly by a mild grinding action renewing the surfaces of contact between zinc particles and solution.

In commercial practice, it may prove desirable to use a ball or tube mill, or a centrifugal pump as a circulating means, using some sand as medium to prevent agglomeration of the zinc, or hold it in suspension, and as an abrasive to work upon the zinc particle faces.

The above described operations may be carried on satisfactorily at ordinary room temperatures, say 20 to 25° C. although it will be understood that the rapidity of the reaction both in solution and precipitation may be increased by raising the temperature of the solutions. For the purpose of economy however it is desirable to operate at ordinary atmospheric temperatures and as the difference of rapidity of precipitation of silver and copper is greater at ordinary temperature than at high temperature it will generally be advantageous to operate at ordinary temperature at least in precipitation of the silver, to provide for maximum of selectivity in the silver precipitation.

When the residual solution remaining after precipitation is passed back to the leaching operation for extraction of a further amount of silver or gold and copper it may be necessary to add sufficient cyanide to take up the additional amount of silver or gold and copper, and the amount so added is desirably sufficient to ensure that throughout the leaching operation there shall be sufficient cyanide in the solution to ensure the presence of free cyanide, for example with certain ores there should be somewhat in excess of four mols of solvent cyanide to each mol of copper in the solution. Otherwise insoluble compounds will be formed containing copper and a certain amount of solvent cyanide will be lost as it will remain with the tailings.

I have found that copper compounds present in the ore susceptible of solution in alkali cyanide solutions, to form the usual complex copper-cyanides, will, if present in excess after a copper cyanide ratio of one mol copper to four mols cyanide (calculated as NaCN), has been formed, indicate that such copper salts will cease to be dissolved and will begin to withdraw cyanide from the solution to form an insoluble or difficultly soluble salt of copper and cyanide, most probably cuprous cyanide (CuCN), until the copper cyanide ratio is around 1 copper : 2.4–2.8 NaCN. This latter solution, on agitation with a further quantity of copper salt, will then lose both copper and cyanide. In commercial practice, of course, the precipitation of an insoluble copper cyanide salt in the leaching tanks results directly in that much cyanide loss through mill tails.

For example, starting with a copper cyanide solution, containing 18.8 pounds cyanide per ton (calculated as NaCN) and 7.4 pounds copper per ton and agitating same with excess of copper carbonate, results in cumulative loss of copper and cyanide in solution at successive twenty-four hour intervals as follows:

*Percentage loss cyanide and copper in solution with time—agitation with excess $CuCO_3.Cu(OH)_2$.*

| | Per cent cyanide lost cumulative. | Per cent copper lost cumulative. |
|---|---|---|
| Start | 0.00 | 0.00 |
| After 24 hrs. agitation | 83.9 | 82.0 |
| After 48 hrs. agitation | 87.9 | 89.8 |
| After 72 hrs. agitation | 89.4 | 86.8 |
| After 86 hrs. agitation | 91.7 | 92.2 |

I have found that with certain ores the minimum ratio which copper and cyanide must bear to each other, for a condition at which copper salts will cease to be dissolved, is on the order of one mol copper to four mols cyanide (calculated as NaCN), which is just above the border line of that required for minimum successful ratios for precipitation of copper by zinc from cyanide solution with such ores; namely, one mol copper to over four and under five mols cyanide (expressed as NaCN) and that again the mol or mols NaCN in excess of approximately three to one mol copper, will be indicated as "free" by titration with $AgNO_3$ in the presence of KI.

Therefore, in commercial mill practice treating copper bearing silver ores by the cyanide process, the amount of available cyanide present in the solution, going to leach fresh ore, is preferably, with certain ores, sufficient to prevent loss of cyanide through precipitation of insoluble cyanide copper compounds and to yield a pregnant solution in which the cyanide, associated with the copper, will bear a ratio of not less than four mols cyanide (expressed as NaCN) to one mol copper, and in which at least an appreciable amount (say approximately one mol cyanide or over) will show itself as "free" by titration with $AgNO_3$ in the presence of KI.

Since there is commonly a slight nonuniformity existing in solutions throughout the leaching tanks, due to variation in the metallic values throughout the ore charge, and variation in uniformity of solution circulation, a certain margin of available cyanide must be provided to prevent local precipitation of copper cyanide salts in the charge, due to local excess of copper in the ore, and this margin can be satisfactorily provided and at the same time provide the minimum ratio for good and consistent copper precipitation by zinc, by so adjusting the feed solution that the pregnant solution carries a copper cyanide solution of one mol copper to nearly five mols cyanide (calculated as NaCN).

It is not possible to exactly calculate a pregnant solution from the original cyanide feed solution and the copper content of the ore, since the solution of cupric salts by alkali or alkaline earth cyanides, results in the absence of excess free cyanide in an unstable cupric cyanide salt, which gradually is converted to a cuprous salt with loss of cyanide in the form of cyanogen gas. Other losses, of course, consist in the unstable nature of the alkali cyanides, the effects of foul solutions and impurities, etc.

Higher cyanide ratios are satisfactory, as far as preventing loss of cyanide by copper, but in commercial practice, are objectionable as a certain solution loss with the tails is experienced, and this, of course, the higher cyanide concentration, the greater the loss of cyanide in pounds per ton of ore treated.

It is therefore desirable in treating certain copper bearing silver ores by the cyanide process in order to prevent cyanide loss due to copper present in the ore to maintain a minimum ratio solvent cyanide (expressed as NaCN) to copper in the pregnant solution or solutions leaving the leaching tanks of about four mols of cyanide to one mol of copper, (such cyanide being associated with the copper in whole or in part and of which cyanide approximately 25% will indicate itself as "free" by titration with $AgNO_3$ in the presence of KI) and in addition to this there should generally, for commercial operations, be present approximately a further mol of cyanide of which substantially the whole will indicate itself as "free" by titration with $AgNO_3$ in the presence of KI.

While that feature of my invention which relates to making use of the stated proportion of cyanide to copper in the leaching solution is especially advantageous when applied in connection with the method of precipitation above described for the reason that both require a sufficient amount of solvent cyanide in proportion to the copper to prevent formation of insoluble complex copper cyanide compounds, for example in certain cases a minimum of over four mols of cyanide to one of copper in the solution it is obvious that the advantages of this method of solution or leaching of the complex silver or gold or copper ores is not limited to any especial method of precipitation of the metals from the resulting solution for example a solution obtained as above described may be subjected to any of the well-known methods for precipitation or deposition, including electro-deposition, to recover the metal contents thereof in any well-known manner.

On the other hand that part of my invention which relates to the precipitation of copper in the presence of a cyanide solution containing a certain stated ratio of cyanide to copper may be carried out irrespective of the method whereby the copper and silver are brought into solution. In case however the method of extraction or leaching is such that the resulting solution contains a higher ratio of copper to cyanide than required for effective precipitation as above described it will be necessary to add cyanide to the solution in order to establish the proper ratio for precipitation of the copper. In case the treatment of the solution in this manner would require the addition of an undue amount of cyanide the process may be economically carried out by separating the solution into two parts, say after precipitation of the silver therefrom, adding to one of such parts sufficient cyanide to establish the required copper: cyanide ratio, then precipitating copper from that part so treated and returning the barren solution with regenerated cyanide together with the other part of the original solution to the leaching operation. In this manner the copper content of the circulating solution may be kept below any desired maximum so as to not interfere with the precipitation cyclic operation and process by reason of the accumulation of the copper in the solution.

While I have described the operation of the invention as applied particularly to certain ores, which require a ratio of at least four mols of solvent cyanide to one mol of copper to effect the desired results, I do not wish to be limited to these exact proportions in all cases, as a somewhat lower ratio may give satisfactory results with some ores. My invention consists in any case, however, as stated above, in maintaining a high enough ratio of solvent cyanide to copper to ensure the presence of some free cyanide, during both the leaching and the precipitating operations, and thus permitting substantially complete solution of the copper from the ore, followed by substantially complete precipitation of the copper, together with or separate from the silver, and substantially complete regeneration of the cyanide in such form as to permit cyclic re-use of the solution.

What I claim is:

1. The process of treating ores containing copper together with gold or silver which consists in extracting gold, silver and copper from such ores by the action of a suitable cyanide solution, and subjecting the solution to the action of a precipitating agent to precipitate the gold or silver and copper therefrom and to regenerate a soluble cyanide in the solution for cyclic use thereof, the cyanide content of the solution being so adjusted that the solution during the precipitation of the copper contains in excess of four mols of cyanide, calculated as sodium cyanide, for each mol of copper present in the solution.

2. The cyclic process of treating ores containing copper together with gold or silver which consists in leaching such ores with a solution containing a soluble cyanide to dissolve copper and gold or silver values, precipitating copper and gold or silver from such solution by the action of a precipitating agent, and returning the barren solution after separation of the precipitates therefrom, to the leaching stage of the process, the process being so carried out that the solution during the precipitation of copper therefrom, contains in excess of four mols of cyanide, calculated as sodium cyanide, for each mol of copper present therein.

3. The process of precipitating copper from cyanide solutions which consists in adjusting the cyanide content of the solution so that at least four mols of cyanide, calculated as sodium cyanide, are present in the solution for each mol of copper present and bringing the solution so constituted into contact with a reducing agent to precipitate the copper.

4. A process of selective precipitating of copper and gold or silver from a solution containing said metals which consists in adjusting the cyanide content of the solution so that at least four mols of the cyanide, calculated as sodium cyanide, are present for each mol of copper present, bringing the solution in contact with metallic zinc for a short period of time to precipitate silver or gold and then bringing the solution into contact with metallic zinc for a longer period of time to precipitate copper and regenerate soluble cyanide in the solution.

5. A process as set forth in claim 4 in which the precipitating operations aforesaid are carried on at substantially atmospheric temperatures, namely, from 20 to 25° C.

6. The process of treating ores containing copper together with silver or gold which consists in leaching such ores with a solution containing a soluble cyanide to dissolve copper and silver or gold therefrom, and precipitating copper and silver or gold from the resulting solution by the action of the precipitating agent, while maintaining in the solution throughout the leaching and precipitating operations a sufficient ratio of cyanide to copper to prevent the formation of insoluble copper cyanide compounds.

7. The cyclic process of treating ores containing copper together with silver or gold which consists in leaching such ores with a solution containing a soluble cyanide to dissolve copper and silver or gold therefrom, precipitating copper and silver or gold from the resulting solution by the action of the precipitating agent and returning the barren solution after separation of the precipitates therefrom to the leaching stage of the process for cyclic operation, while maintaining in the solution throughout the leaching and precipitating operation a sufficient ratio of cyanide to copper to prevent the formation of insoluble copper cyanide compounds.

8. The process of treating ores containing silver, or gold, and copper which consists in leaching such ores with a solution containing a solvent cyanide, and precipitating silver or gold and copper from the resulting solution by means of a suitable precipitating agent, sufficient cyanide being provided in the solution during the precipitation of the copper to ensure the presence of free cyanide and to enable precipitation of the copper in metallic form and to cause regeneration of solvent cyanide in the solution for use in cyclic repetition of the process.

9. The process of treating ores containing silver or gold, together with copper, which consists in extraction of silver or gold and copper from such ores by the action of a solution containing solvent cyanide and an alkaline reagent, subjecting the resulting solution to the action of finely divided zinc, to precipitate silver, or gold, and copper, sufficient cyanide being provided during the copper precipitation to ensure the presence of free cyanide and to enable precipitation of the copper in metallic form and to cause regeneration of solvent cyanide in the solution for use in cyclic operation of the process.

10. The process of treating ores containing silver or gold together with copper which consists in extraction of the silver or gold together with copper from such ores by the action of a solution containing solvent cyanide and an alkaline reagent, and subjecting the resulting solution to the action of finely divided zinc to precipitate silver or gold and copper, the amount of cyanide in the solution being maintained in excess of four mols of cyanide for each mol of copper in the solution during both the leaching and the precipitating operations.

11. The process of extracting values from ores containing silver or gold, together with copper, which consists in subjecting ores to the action of a solution containing a solvent cyanide in an amount exceeding four mols of cyanide (calculated as NaCN) to one mol of copper.

12. The process of recovering silver or gold and copper from a cyanide solution containing same, which consists in subjecting the solution to action of metallic zinc to precipitate silver or gold and further subjecting the solution to the action of metallic zinc while maintaining in the solution sufficient free cyanide to precipitate metallic copper and form zinc cyanide, without substantial precipitation of copper in the form of complex cyanides.

13. The process of extracting values from ores containing silver or gold together with copper which consists in subjecting such ores to the action of a solution containing sufficient solvent cyanide to ensure the presence of free cyanide throughout such operation so as to substantially prevent the formation of insoluble copper cyanide compounds.

14. The process of selective precipitation of copper and gold or silver from a solution containing said metals which consists in adjusting the cyanide content of the solution so that sufficient cyanide is present in proportion to the copper content to ensure the presence of free cyanide throughout the precipitating operation so as to prevent the formation of insoluble copper cyanide compounds, bringing the solution into contact with metallic zinc for a short period of time to precipitate silver or gold and then bringing the solution into contact with metallic zinc for a longer time to precipitate copper and regenerate soluble cyanide in the solution.

In testimony whereof I have hereunto subscribed my name this 5th day of November 1923.

HARRY V. WELCH.